US010141758B2

(12) United States Patent
Massar

(10) Patent No.: US 10,141,758 B2
(45) Date of Patent: Nov. 27, 2018

(54) POWER CARD AND BASE

(71) Applicant: Westhill Innovation, LLC, Mukwonago, WI (US)

(72) Inventor: Luke G. Massar, Mukwonago, WI (US)

(73) Assignee: Westhill Innovation, LLC, Mukwonago, WI (US)

( * ) Notice: Subject to any disclaimer, the term of this patent is extended or adjusted under 35 U.S.C. 154(b) by 0 days.

(21) Appl. No.: 15/638,202

(22) Filed: Jun. 29, 2017

(65) Prior Publication Data
US 2018/0034295 A1 Feb. 1, 2018

Related U.S. Application Data

(60) Provisional application No. 62/367,036, filed on Jul. 26, 2016.

(51) Int. Cl.
H02J 7/00 (2006.01)
H04M 1/02 (2006.01)

(52) U.S. Cl.
CPC ............ H02J 7/0044 (2013.01); H02J 7/007 (2013.01); H02J 7/0027 (2013.01); H02J 7/0054 (2013.01); H04M 1/0262 (2013.01); H04M 1/0274 (2013.01)

(58) Field of Classification Search
None
See application file for complete search history.

(56) References Cited

U.S. PATENT DOCUMENTS

| 4,147,969 | A |   | 4/1979  | Miller et al. |             |
|-----------|---|---|---------|---------------|-------------|
| 5,519,776 | A | * | 5/1996  | Kodama        | H02J 7/0045 |
|           |   |   |         |               | 379/435     |
| 6,265,845 | B1|   | 7/2001  | Bo et al.     |             |
| 6,967,464 | B2|   | 11/2005 | Heigl et al.  |             |
| 9,153,986 | B1| * | 10/2015 | Herr          | H02J 7/0044 |
| 9,318,915 | B2|   | 4/2016  | Miller et al. |             |
| 9,385,549 | B2|   | 7/2016  | Miller et al. |             |
| 2004/0263117 | A1 | | 12/2004 | Kogan et al. |             |
| 2008/0214248 | A1 | | 9/2008  | Hensel       |             |
| 2009/0051313 | A1 | | 2/2009  | Yoshimura et al. |         |
| 2009/0179610 | A1 | | 7/2009  | Lin          |             |
| 2010/0176761 | A1 | | 7/2010  | Suzuki et al. |            |

(Continued)

FOREIGN PATENT DOCUMENTS

| CN | 104578360 | 4/2015  |
| CN | 204794164 | 11/2015 |

OTHER PUBLICATIONS

PowerPack Direct Connect Series: Portable Rechargeable Battery for Smartphones, specification sheet, Ver. 07.24.14, PNY Technologies, Inc., Parsippany, NJ, USA.

Primary Examiner — Robert Grant
Assistant Examiner — Tynese McDaniel
(74) Attorney, Agent, or Firm — Manatt, Phelps & Phillips, LLP

(57) ABSTRACT

Disclosed is a power card and base for charging and/or recharging electronic devices, including a method of authenticating an exclusive charging plug. The power card and base may include electronic components for charging and/or recharging electronic devices. The power card and base may include exclusive components configured to secure a connection between the power card and power base.

16 Claims, 10 Drawing Sheets

(56) References Cited

U.S. PATENT DOCUMENTS

| | | |
|---|---|---|
| 2011/0134601 A1 | 6/2011 | Sa |
| 2012/0187902 A1 | 7/2012 | Wang |
| 2012/0279516 A1 | 11/2012 | Bouix et al. |
| 2013/0175993 A1* | 7/2013 | Chen .................... H02J 7/0027 320/114 |
| 2013/0273983 A1 | 10/2013 | Hsu |
| 2013/0314880 A1 | 11/2013 | Sun et al. |
| 2014/0049208 A1* | 2/2014 | Carkner ............. H01M 2/1005 320/103 |
| 2014/0184139 A1 | 7/2014 | Wen |
| 2015/0194839 A1* | 7/2015 | Wojcik ................. H01M 10/46 320/108 |
| 2015/0249358 A1* | 9/2015 | Calkins .................. H02J 50/80 320/108 |
| 2015/0318716 A1* | 11/2015 | Pickens ................ H02J 7/0003 320/110 |
| 2015/0358439 A1 | 12/2015 | Carnevali |
| 2016/0098770 A1 | 4/2016 | Chang et al. |
| 2016/0099575 A1* | 4/2016 | Velderman ................ H02J 5/00 307/72 |
| 2017/0222446 A1* | 8/2017 | Tan ........................ H02J 7/007 |

* cited by examiner

POWER CARD AND BASE

CROSS-REFERENCE TO RELATED APPLICATIONS

This application claims priority to U.S. Provisional Patent Application No. 62/367,036 entitled "POWER CARD AND BASE" filed Jul. 26, 2016. U.S. Provisional Patent Application No. 62/367,036 is hereby expressly incorporated by reference in its entirety herein.

BACKGROUND

Technical Field

This disclosure relates to a power card and base, and more particularly, relates to a power card and base for recharging electronic devices.

Description of Related Art

Electronic devices have continued to expand the capabilities of individuals all over the world. Electronic devices, such as cell phones and portable music players, will typically utilize rechargeable batteries to power the electronic device. As the electronic device is used, the battery is drained and needs to be recharged to continue the functions of the electronic device. As such, a need for a power card and base has evolved.

SUMMARY

In one embodiment, a power card can be configured to charge an electronic device. The power card can include a case, a connector, and at least one exclusive charging contact. The case can be configured to enclose at least one rechargeable battery and a circuit board. The at least one rechargeable battery and the circuit board can be electrically connected. The connector can be electrically connected to the circuit board. The at least one proprietary charging contact can be electrically connected to the circuit board. The at least one exclusive charging contact can be configured to receive power and charge the at least one rechargeable battery.

Another embodiment provides a method of authenticating an exclusive charging plug. The method includes receiving the exclusive charging plug, verifying the exclusive charging contact, and permitting transmission of power. The method can include receiving the exclusive charging plug into an exclusive charging jack. The method can further include verifying an exclusive charging contact of the exclusive charging plug that corresponds to an exclusive charging contact of the exclusive charging jack. The method can further include permitting transmission of power between the exclusive charging contact of the exclusive charging plug and the exclusive charging contact of the exclusive charging jack.

In another embodiment, a power base can be configured to charge at least one power card. The power base can include a case, at least one power card cavity, at least one connector port, at least one latch, and at least one exclusive charging plug. The case can be configured to enclose at least one power converter. The at least one power card cavity can be configured to receive the at least one power card. The at least one connector port can be disposed within the at least one power card cavity. The at least one connector port can be configured to receive at least one connector of the at least one power card. The at least one latch can be configured to connect with at least one latch cavity of the at least one power card. The at least one exclusive charging plug can be electrically connected to the at least one power converter. The at least one exclusive charging plug can be configured to transmit power to and charge at least one rechargeable battery of the at least one power card.

DETAILED DESCRIPTION

Figure 1:
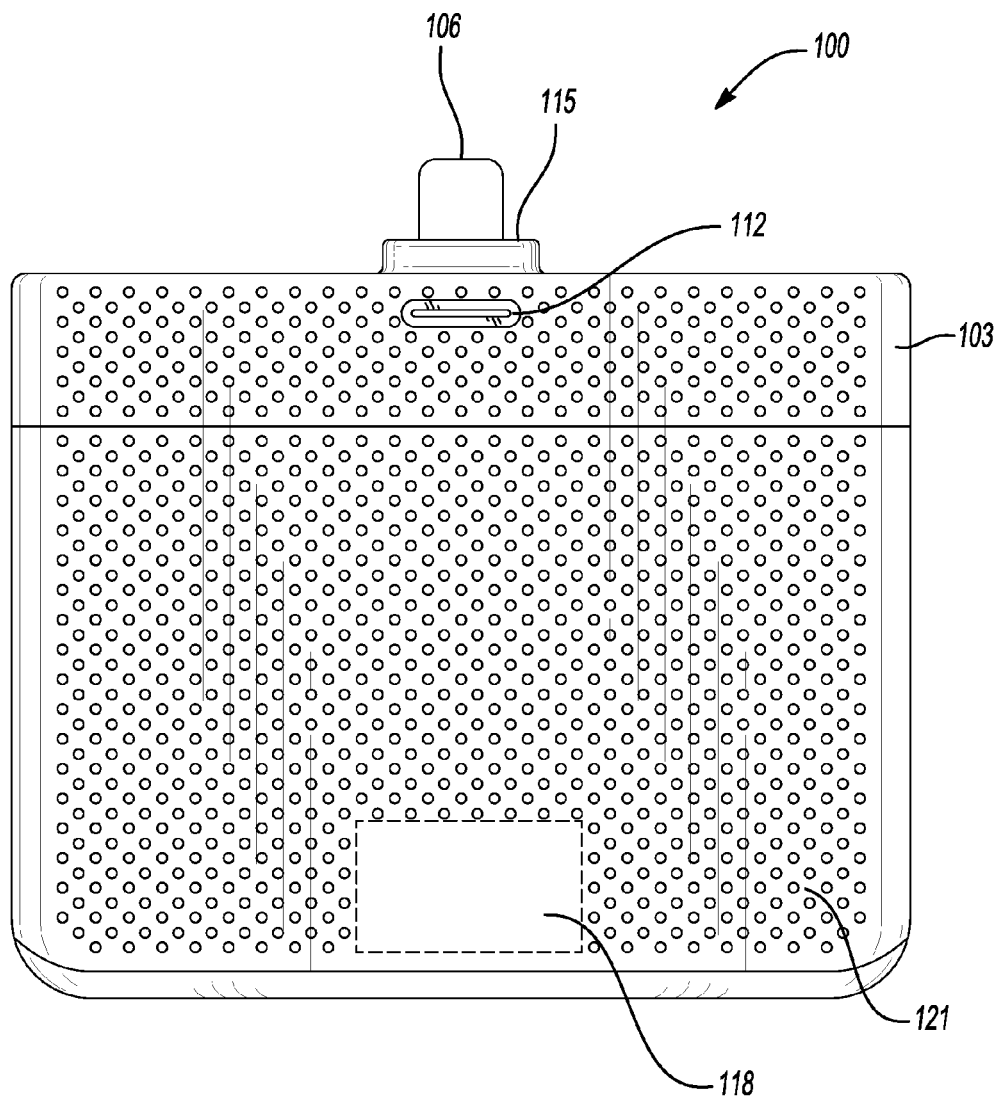
FIG. 1 illustrates a front view of a power card in accordance with an illustrative embodiment of the present invention.

As will be appreciated by one skilled in the art, there are numerous ways of carrying out the examples, improvements, and arrangements of a power card and base in accordance with embodiments disclosed herein. Although reference will be made to the illustrative embodiments depicted in the drawings and the following description, these embodiments are not meant to be exhaustive of the various alternative designs and embodiments that are encompassed by the disclosed invention. Those skilled in the art will readily appreciate that various modifications may be made, and various combinations can be made, without departing from the invention.

The term "connector," as used herein, may refer to one or more pieces that can be configured to link two or more devices. For example, the link can be a physical link, electrical link, material link, or any other type of link.

The term "electronic device" or "portable electronic device," as used herein, may refer to any piece of electrically-powered equipment. For example, these devices can be consumer electronic devices capable of communications, data processing, and/or utility. Examples range from handheld, lightweight electronic devices such as tablets, e-readers, and smartphones to small devices such as MP3 players and electronic toys.

The term "power base," as used herein, may refer to a charging and/or recharging station. The power base, for example, can charge and/or recharge a battery of a power card. The power base may include a number of charging slots or cavities for a number of power cards.

The term "power card," as used herein, may refer to a portable device that includes a rechargeable battery that is configured to charge and/or recharge electronic devices. The power card can also connect to a power base to be recharged.

The term "exclusive charging contact," as used herein, may refer to a unique electrical circuit component made of electrically conductive material. For example, an exclusive charging contact may be an anode, cathode, or both an anode and cathode. An exclusive charging contact can be a pogo pin and/or pogo pad.

The term "exclusive charging jack," as used herein, may refer to a unique electrical circuit component made of electrically conductive material that incorporates a female-style exclusive charging contact. For example, an exclusive charging jack can be a pogo pad.

The term "exclusive charging plug," as used herein, may refer to a unique electrical circuit component made of electrically conductive material that incorporates a male-style exclusive charging contact. For example, an exclusive charging plug can be a pogo pin.

The term "USB" or "Universal Serial Bus," as used herein, may refer to an industry standard that defines the cables, connectors, and/or communications protocols used in a bus for connection, communication, and/or power supply between computers and electronic devices. A USB is a standardized connection for personal computer and computer peripherals, including, but not limited to, keyboards, pointing devices, digital cameras, printers, portable media players, disk drives, power chargers, and network adapters.

A power card and power base can be used together to provide power to an electronic device. A power card includes several components including, but not limited to, a casing, connector, latch cavity, separator, inscription location, and non-slip surface. The power card is first charged or recharged using the power base. Charging and recharging can be used interchangeably. When a power card is charged, the power card can be removed from the charging station of the power base and is available to recharge an electronic device. The connector can be inserted into a charging port of the electronic device that receives the connector. When inserted into the charging port, an electronic connection is established and maintained for charging the electronic device. The electronic connection allows power to be transferred from the power card to the battery of the electronic device. As the electronic device is charged, the power stored in the battery of the power card is dissipated. When the battery of the power card is fully dissipated, the power card requires another charge.

The power card can be charged or recharged using the power base. The power card includes exclusive charging jacks and exclusive charging contacts for charging the battery of the power card. The exclusive nature of the jacks and contacts requires an exclusive charging plug. The exclusive charging plug is included with the power base. The exclusive nature of the jack, plug, and contacts helps to prevent theft, counterfeit products, and other issues that may arise.

The power card includes at least two exclusive charging jacks. In one embodiment, the power base can include only one exclusive charging plug that will connect with one of the at least two exclusive charging jacks. The exclusive charging jacks are positioned such that each mirrors the other. The mirror-style positioning of the exclusive charging jacks provides for position independent charging. In other words, regardless of the position at which a power card is inserted into the charging position of the power base, at least one of the exclusive charging jacks of the power card will align with at least one of the exclusive charging plugs of the power base. The position of the exclusive charging jacks makes the power card reversible and position independent. As such, the exclusive charging contacts will make contact and provide an electrical connection between the power card and the power base.

The power card and base system will be described with respect to the illustrative drawings.

Power Card

FIG. 1 illustrates a front view of a power card 100. The power card 100 includes a casing 103, connector 106, latch cavity 112, separator 115, inscription location 118, and non-slip surface 121.

The casing 103 encloses at least one rechargeable battery (not shown) and at least one circuit board (not shown). The casing 103 also partially encloses the connector 106. The casing 103 is configured to protect the at least one rechargeable battery and the at least one circuit board. The casing 103 is also configured to provide a compact design for a user of the power card 100. The compact design provides the user with one physical piece, such as the power card 100.

The casing 103 includes the separator 115. The separator 115 is connected to the casing 103 near the top of the casing. The separator 115 provides support, strength, and durability to the connector 106 and helps reduce the likelihood of the connector 106 from breaking away from the case 103. The separator 115 also separates the main portion of the casing 103 from the connector 106. The separator 115 separates the connector 106 from the casing 103 to accommodate for chargeable devices having accessory components. For example, the power card 100 can charge a phone. The phone may have a phone case around it that provides a gap between the port of the phone that receives connector 106 and the outside of the phone case. The power card 100 is configured with a separator 115 that accommodates for the gap. The power card 100 can connect to a phone with an accessory such as a phone case because the separator 115 accounts for the gap. In another example, where a phone case is not disposed around a phone, a gap may be present between the port of the phone that receives connector 106 and the casing 103.

In one embodiment, the casing 103 can include an indicator (not shown) that indicates when a power card is not charged, partially charged, and/or fully charged. For example, the indicator can be a plurality of light-emitting diodes (LED) on a LED display. The LEDs are configured on the casing 103 such that the LEDs are exposed when the power card 100 is engaged with a power base. The LEDs can continuously emit light, intermittently emit light, and/or not emit light. The LEDs on the power card 100 are configured to indicate the charging level and status of at least one battery of the power card 100.

In another example, the LEDs are disposed on the bottom of the casing 103 of the power card. The bottom of the casing 103 is the opposite end of the casing from the separator 115 and connector 106. The LEDs are beacon LEDs that provide information regarding the amount of charge, if any, remaining on the battery. For example, the LEDs may indicate that the charge remaining is high (full or almost full charge or more than 75% charge remaining), moderate (about 50% charge remaining), or low (less than 25% charge remaining). A number of variations of charge percentages and levels can be used.

The connector 106 is electrically connected to the at least one rechargeable battery and the at least one circuit board. The connector 106 is configured to electrically connect the at least one rechargeable battery and the at least one circuit board to a portable electronic device. Examples of portable electronic devices include a cellular phone, a smartphone, a tablet, an e-reader, a global positioning system, an electronic watch, a set of earphones or headphones, a digital and/or video camera, a calculator, a handheld computer game, and/or any other electronic device.

The portable electronic device can be charged and/or recharged using the power card 100. The electrical connection between the connector 106 and the portable electronic device creates a channel by which energy can be transferred. Energy can be transferred from the connector 106 to the portable electronic device. The transfer of energy discharges energy stored in the at least one rechargeable battery of the power card 100 and charges at least one rechargeable battery of the portable electronic device.

The connector 106 can include any type of connector available to charge and/or recharge a portable electronic device. Examples of connectors include an USB Type-C connector, a micro-USB connector, a USB Micro-B connector, mini-USB, Lightning connector, 30-pin dock connector, and/or common connectors.

The latch cavity 112 is configured to allow the power card 100 to mechanically connect to or snap into a power base. The power base is the docking station where the power card 100 is stored when not in use. The power base facilitates the recharging of the power card 100. The user can determine when the power card 100 is securely in place by visual, hearing, and/or touch inspection to confirm the power card 100 is secured. The power card 100 is secured when the latch cavity 112 is secured by at least one clip of the power base.

Inscription location 118 is the location on the casing 103 where an inscription can be placed. In one example, the inscription can be the name of the company providing the power card 100. In another example, the inscription can be an advertisement. The inscription location 118 can be of any size and at any location on the power card 100.

The non-slip surface 121 is a surface that provides the user with the ability to securely grip the power card 100. The non-slip surface 121 can be made of any of a number of materials and/or combinations that provide a secure grip for the user. The non-slip surface 121 can also include at least one pattern inscribed in the casing 103. In the illustrative embodiment, a dotted pattern is shown on the non-slip surface 121. The non-slip surface 121 of the power card 100 can be used at the inscription location 118.

In one embodiment, the connector 106 of the power card 100 is configured to directly connect to an electronic device. The direct connection provides a physical and an electronic link between the connector 106 and the electronic device. In another embodiment, the connector 106 of the power card 100 is configured to indirectly connect to an electronic device via an adapter. The connector 106 is configured to connect to the adapter. The adapter is configured to connect to the electronic device.

In another embodiment, the power card 100 is configured to resist liquids and other elements. The power card is configured to operate normally while its outside casing and connector are exposed to liquids and other elements. For example, a liquid- and element-resistant power card prevents foreign liquids and elements from entering the internal area of the power card, where the electronic components (for example, battery, transistors, and wiring) of the power card are disposed. By resisting foreign liquids and elements, the performance of the power card is not affected. As such, a power card submerged in liquid (for example, water) or covered with elements (for example, dirt) will not affect its performance.

In one embodiment, a liquid- and element-resistant power card is completely sealed from the outside environment. For example, a power card can be completely sealed by molding the casing 103 around the internal electronic components of the power card. The connector 106 and the separator 115 can also be molded with the casing 103 to provide liquid and water resistance. In another example, a power card can be completely sealed by using an adhesive (for example, glue or tape) to attach or combine the casing 103, connector 106, separator 115, and/or any combination of components. The adhesive, for example, can be used to combine multiple portions of the casing 103. The multiple portions of the casing 103 can be forged together to create a seal. In another example, the seal can be made of rubber or silicone to seal the components. The seal keeps foreign liquid and elements out of the internal portions of the power card. As used herein, "resistant" can also mean completely resistant in some circumstances. For example, a liquid-resistant power card can be entirely liquid-proof. As used herein, a "seal" can be a gasket.

In another embodiment, the power card 100 has Bluetooth™ and Wi-Fi™ capabilities. With Bluetooth™ capabilities, the power card 100 can exchange data over short distances (using short-wavelength UHF radio waves). With Wi-Fi™ capabilities, the power card 100 can connect to other devices via wireless local area networking. Over both Bluetooth™ and Wi-Fi™, the power card 100 can exchange data, including charge level of the power card, charge level of the device the power card is charging, purchase data of the user of the power card, the power card unique identification number, and other data.

Figure 2:
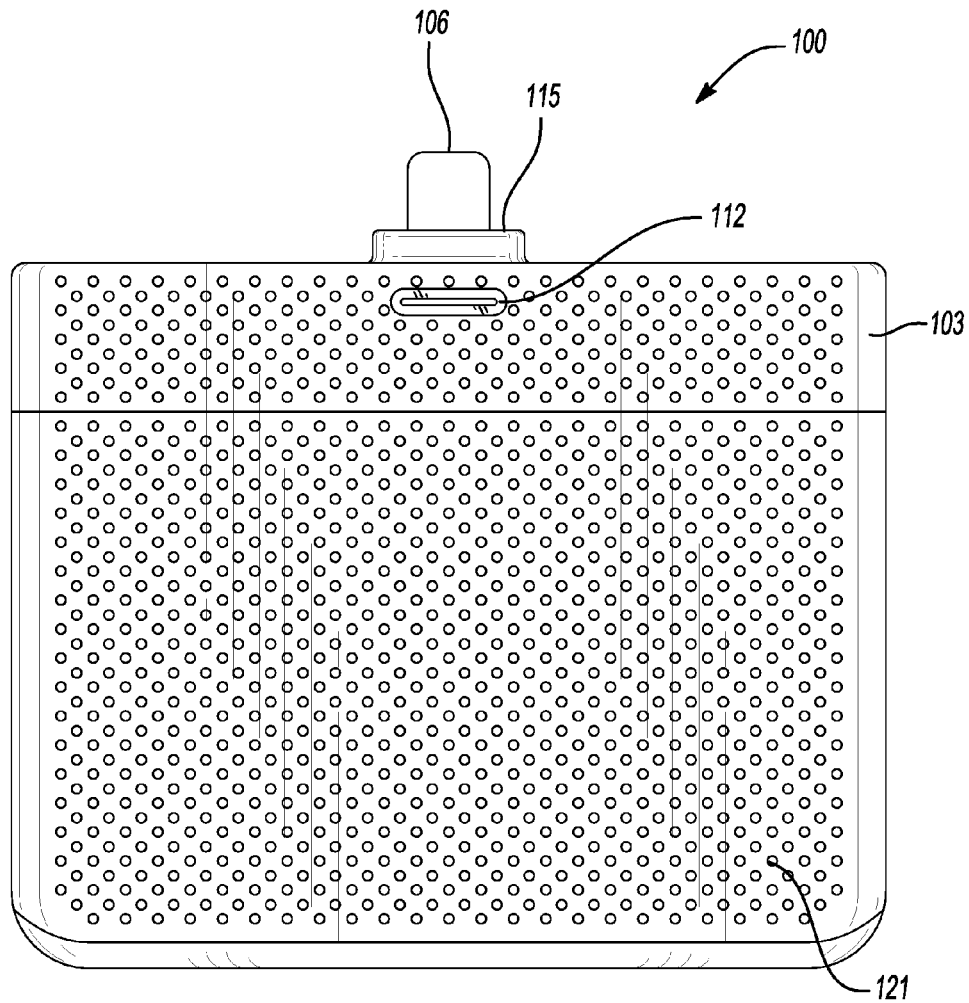
FIG. 2 illustrates a back view of a power card in accordance with an illustrative embodiment of the present invention.

FIG. 2 illustrates a back view of a power card 100. The power card 100 includes a casing 103, connector 106, latch cavity 112, separator 115, and non-slip surface 121. In the illustrative embodiment, the back view appears similar to the front view illustrated in FIG. 1 except that the back view does not illustrate an inscription location 118. Although the back view does not illustrate an inscription location 118, the back of the power card 100 can include an inscription location. In the illustrative embodiment, the power card 100 includes at least similar and/or identical features as those described herein.

Figure 3:
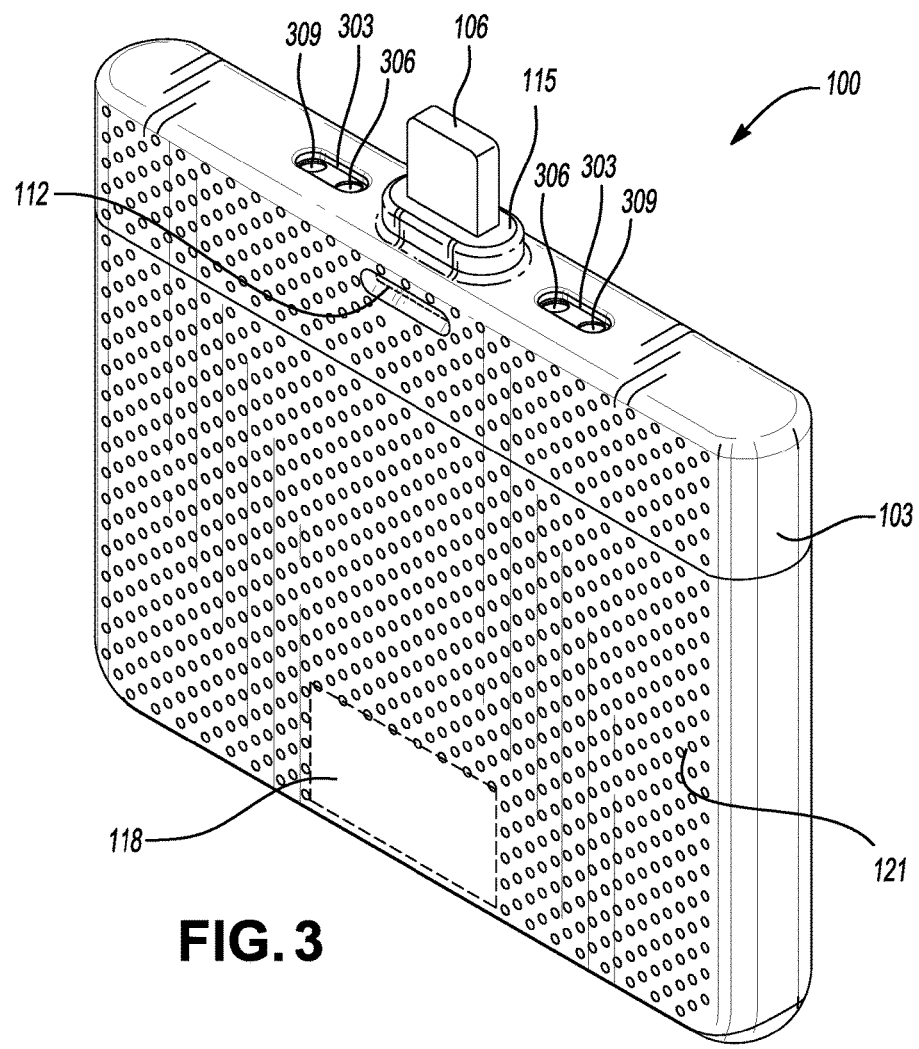
FIG. 3 illustrates a perspective view of a power card in accordance with an illustrative embodiment of the present invention.

FIG. 3 illustrates a perspective view of a power card 100. The power card 100 includes a casing 103, connector 106, latch cavity 112, separator 115, inscription location 118, non-slip surface 121, exclusive charging jack 303, inner exclusive charging contact 306, and outer exclusive charging contact 309. In the illustrative embodiment, the power card 100 includes at least similar and/or identical features as those described herein.

The exclusive charging jack 303 is a charging cavity that is designed to be unique to the power card 100 and the power base. The power card 100 is designed to be charged using the exclusive charging jack 303. The exclusive charging jack 303 is a female connector that receives a male complementary exclusive charging plug of the power base. The power card 100 is designed such that no charging system other than the power base equipped with the complementary exclusive charging plug can be used. One purpose of the exclusive charging jack 303 and the exclusive charging plug is to prevent theft of the power card 100. Another purpose of the exclusive charging jack 303 and the exclusive charging plug is to create an exclusive relationship or connection between the exclusive charging jack 303 and the exclusive charging plug.

The inner exclusive charging contact 306 and the outer exclusive charging contact 309 provide contacts so that the power base can electrically connect with the power card 100. The electrical connection to the power base provides the necessary channel by which the power card 100 can be charged and/or recharged. The inner exclusive charging contact 306 and the outer exclusive charging contact 309 can be charged via capacitive or inductive coupling. In one illustrative embodiment, the power card 100 includes at least two inner exclusive charging contacts 306 and at least two outer exclusive charging contacts 309. Likewise, the power card 100 includes at least two exclusive charging jacks 303. The inner exclusive charging contact 306 and the outer exclusive charging contact 309 contact the electrical contacts of the male complementary exclusive charging plug if the power base is designed to the standards of the exclusive charging jack 303 of the power card 100. If the standard of the power card or power base is different from the other, the charging contacts will not meet. As a result, the power card will not be charged and/or recharged by the power base. For example, the electronic ratings (for example, current rating, voltage rating, power rating, or others) of the power base and the power card should be complementary so that the transfer of energy is efficient and safe. In another example, the electronic ratings of the power base are dependent upon the electronic ratings of the power card.

Figure 4:
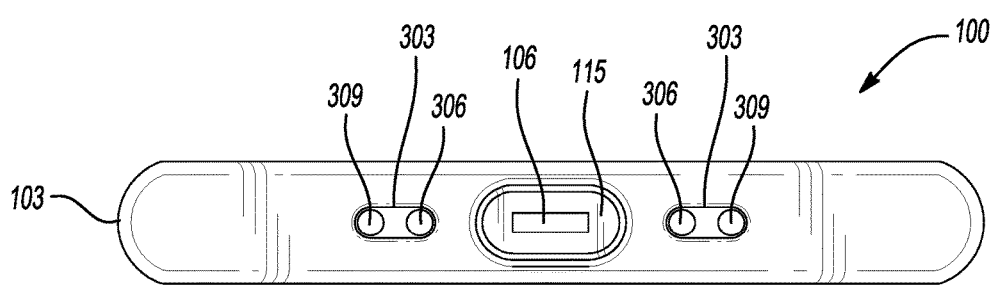
FIG. 4 illustrates a top view of a power card in accordance with an illustrative embodiment of the present invention.

FIG. 4 illustrates a top view of a power card 100. The power card 100 includes a casing 103, connector 106, separator 115, exclusive charging jack 303, inner exclusive charging contact 306, and outer exclusive charging contact 309. In the illustrative embodiment, the power card 100 includes at least similar and/or identical features as those described herein.

In the illustrative embodiment, the exclusive charging jack 303 is illustrated as being oval in shape, but is not limited to being oval in shape. The exclusive charging jack 303 can be any shape that creates a connection between the power card 100 and the power base. The connection can be unique and/or common. The connection is designed to match only the power card 100 and the power base such that no other charging system can charge and/or recharge the power card 100.

In the illustrative embodiment, the inner exclusive charging contact 306 and the outer exclusive charging contact 309 are illustrated as being circular in shape. The inner exclusive charging contact 306 and the outer exclusive charging contact 309 can be any shape that creates a connection between the power card 100 and the power base. The connection can be unique and/or common. The connection is designed to match only the contacts of the power card 100 and the contacts of the power base such that no other charging system can charge and/or recharge the power card 100.

Power Base

Figure 5:
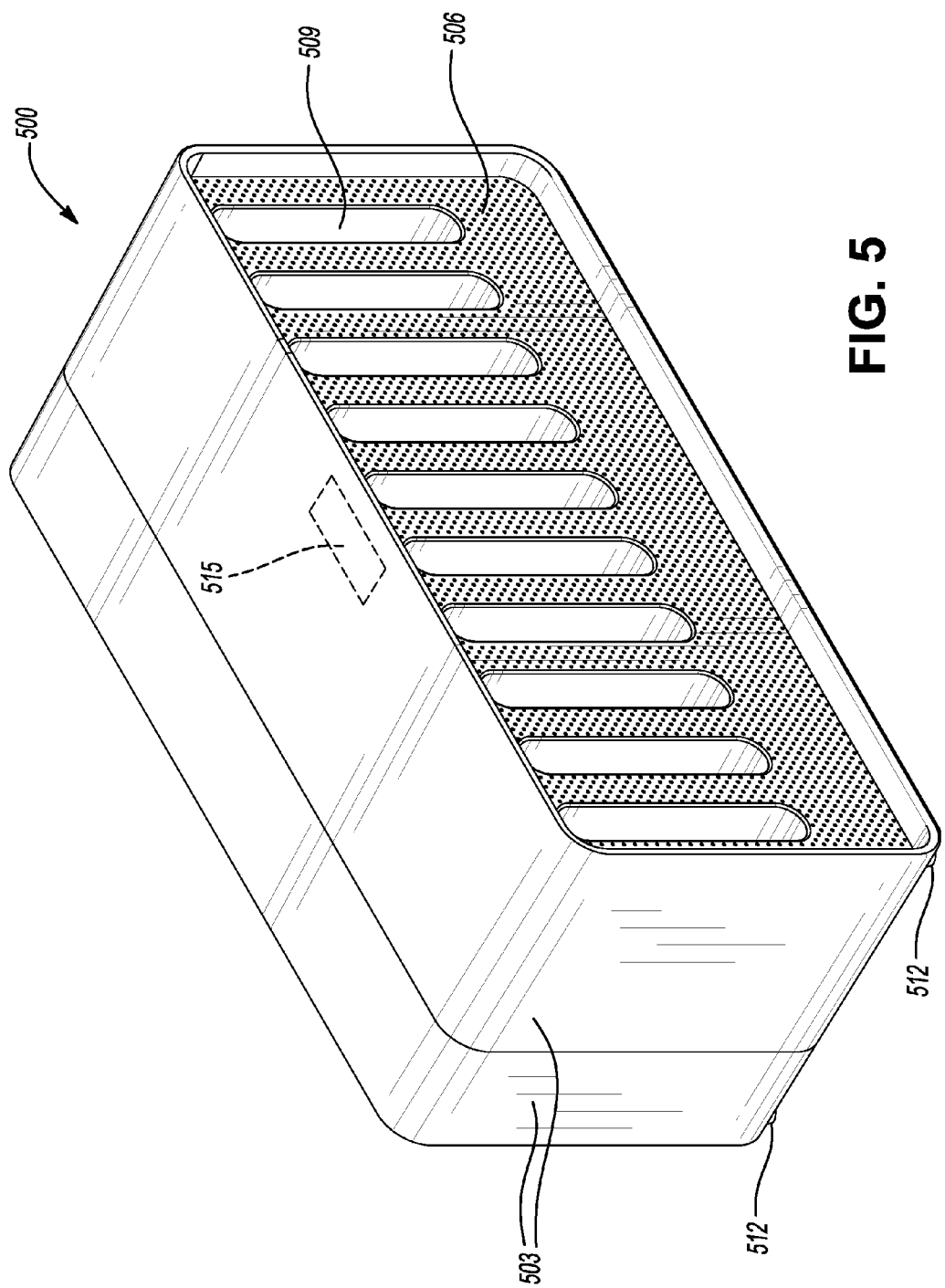
FIG. 5 illustrates a perspective view of a power base in accordance with an illustrative embodiment of the present invention.

FIG. 5 illustrates a perspective view of a power base 500. The power base 500 includes a casing 503, front power base surface 506, power card cavity 509, legs 512, and inscription location 515.

The casing 503 encloses at least one power converter. In one embodiment, the at least one power converter can convert alternating current to direct current. In another embodiment, the at least one power converter can convert direct current into another type of direct current. In another embodiment, the at least one power converter can change the voltage, current, and/or frequency of the electrical signal being received. The at least one power converter is an electrical and/or electro-mechanical device for converting electrical energy.

The front power base surface 506 encloses one side of the power base 500. The front power base surface 506 can include an indicator (not shown) that indicates when a power card is not charged, partially charged, and/or fully charged. The indicator can be a light-emitting diode (LED) display, for example.

The power base 500 includes at least one power card cavity 509. The at least one power card cavity 509 is a cavity or slot that receives at least one power card 100. The at least one power card cavity 509 is designed such that the at least one power card 100 can be disposed of inside of the at least one power card cavity 509. The at least one power card cavity 509 is illustrated as being oval in shape. However, the at least one power card cavity 509 can be any of a number of shapes, for example, circular, triangular, square, pentagonal, or any other shape. The at least one power card 100 should be substantially similar in shape to the at least one power card cavity 509 so that the at least one power card 100 fits within the cavity.

The power base 500 includes at least one leg 512. In FIG. 5, the power base 500 includes four legs 512 (2 shown, 2 not shown). Although illustrated as having four legs 512, power base 500 can include any combination of legs 512 and/or include no legs. The power base 500 is stackable. The legs 512, located on the bottom portion of the power base 500, can rest on the top of another power base 500. For example, the power base 500 can be stacked on additional power bases 500 such that the number of power card cavities 509 can be increased. For each power base 500, the number of power card cavities 509 is multiplied by the number of stacked power bases 500. As illustrated in FIG. 5, the power base 500 includes 10 power card cavities 509. Stacking an additional power base 500 on the power base 500 would increase the number of power card cavities 509 from 10 to 20 power card cavities 509. Any number of power bases 500 can be stacked.

The power base 500 includes at least one inscription location 515. In one illustrative embodiment, the at least one inscription location 515 is located on top of the power base 500. However, the at least one inscription location 515 can be located anywhere on the power base 500. The power base 500 can include any number of inscription locations 515.

Figure 6:
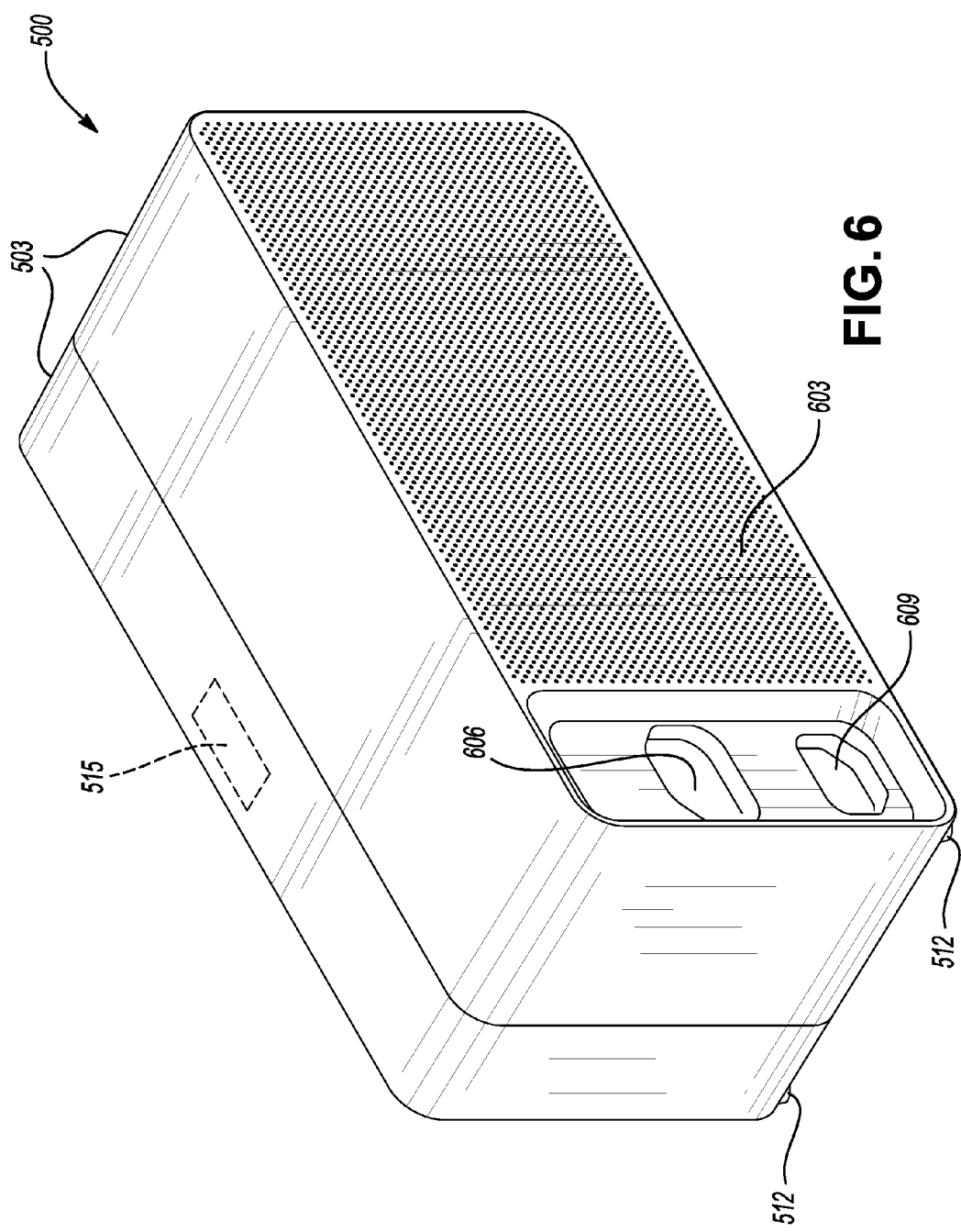
FIG. 6 illustrates a perspective view of a power base in accordance with an illustrative embodiment of the present invention.

FIG. 6 illustrates a perspective view of a power base 500. The power base 500 includes a casing 503, legs 512, inscription location 515, rear power base surface 603, upper power outlet cavity 606, and lower power outlet cavity 609. In the illustrative embodiment, the power base 500 includes at least similar and/or identical features as those described herein.

The rear power base surface 603 encloses one side of the power base 500.

The upper power outlet cavity 606 and lower power outlet cavity 609 provide cavities for power outlet connections to be disposed. For example, a power outlet connection device (not shown) can be inserted into the cavities. The power outlet connection device can be electrically connected to the internal components of the power base 500 to provide an electrical charge to the connector ports within the power base 500. The power outlet connection device can be electrically connected to a standard alternating current outlet.

The power outlet connection device can be electrically connected to an additional power base 500 and/or a marketing display.

In another embodiment, upper power outlet cavity 606 is configured to support an electronic device (for example, electrical wiring, an analog-to-digital converter, or other device) that provides power out (for example, "ground") and lower power outlet cavity 609 is configured to support an electronic device (for example, electrical wiring, an analog-to-digital converter, or other device) that provides power in (for example, power supplied to the power base, power card, system, and devices).

Figure 7:
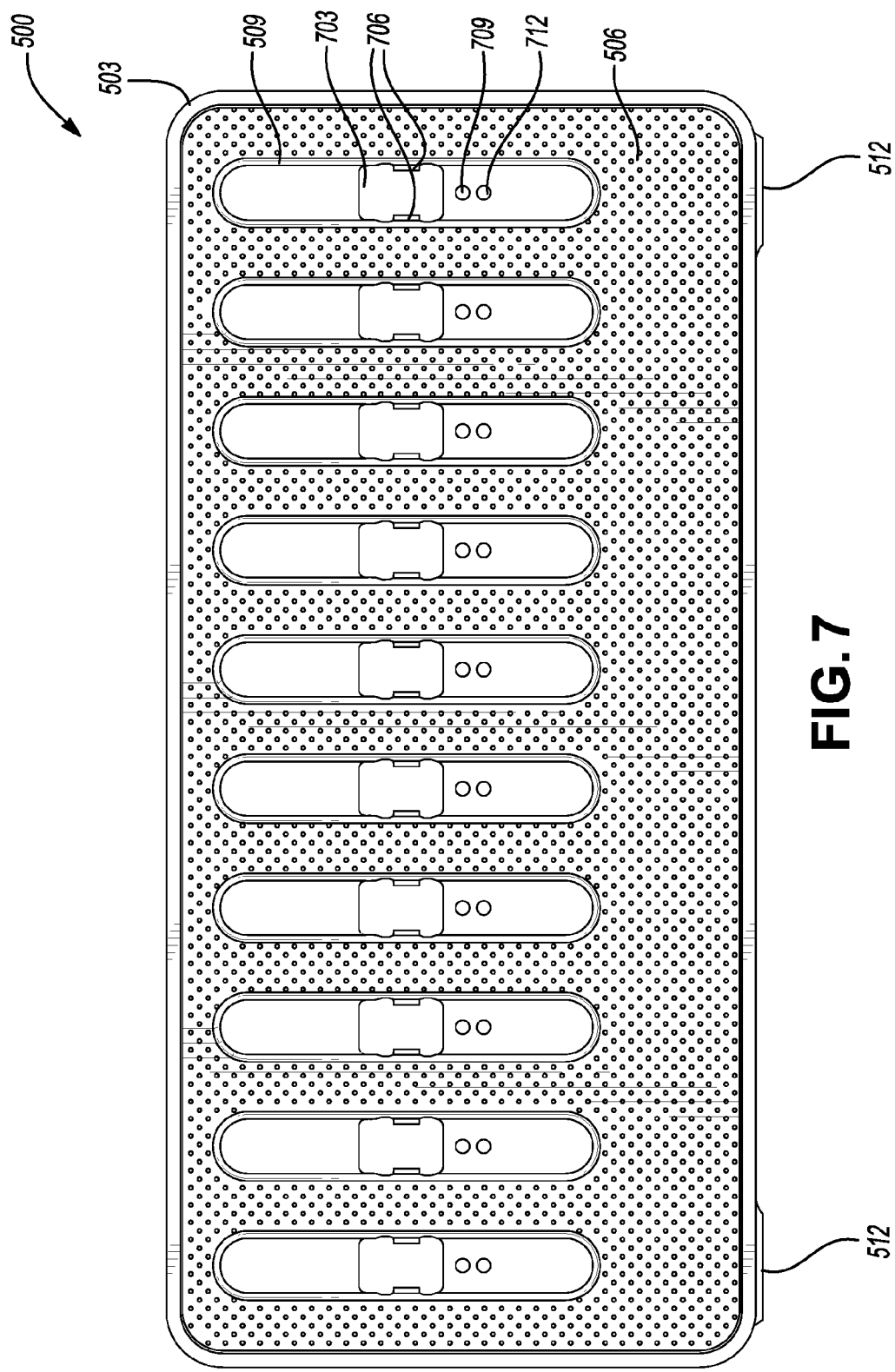
FIG. 7 illustrates a front view of a power base in accordance with an illustrative embodiment of the present invention.

FIG. 7 illustrates a front view of a power base 500. The power base 500 includes a casing 503, front power base surface 506, power card cavity 509, legs 512, connector port 703, latch 706, inner exclusive charging plug 709, and outer exclusive charging plug 712. In the illustrative embodiment, the power base 500 includes at least similar and/or identical features as those described herein.

The connector port 703 is a port that receives the connector 106. The connector port 703 is configured to accept any type of connector 106. The connector port 703 is not limited to only one type of connector. In one embodiment, the connector port 703 physically connects to the connector 106 when a power card 100 is properly inserted into the power card cavity 509. In one example, the connector 106 can be securely fastened with the connector port 703. In another example, the connector 106 can freely rest or move within the connector port 703.

The connector port 703 can be configured to receive any type of connector available that may be disposed on the power card 100. Examples of connectors include an USB Type-C connector, a micro-USB connector, a USB Micro-B connector, mini-USB, Lightning connector, 30-pin dock connector, and/or common connectors.

The latch 706 connects with the latch cavity 112. The latch 706 is configured to snap into the power card 100 when there is a proper disposition of the power card 100 in the power base 500. The connection of the latch 706 with the latch cavity 112 indicates to a user that the power card 100 is disposed correctly in the power base 500. The user can determine when the power card 100 is securely in place by visual, hearing, and/or touch inspection to confirm the power card 100 is secured by the latching mechanism, latch 706 and latch cavity 112. The power card 100 is secured when the latch cavity 112 is secured by at least one latch 706 of the power base 500.

The inner exclusive charging plug 709 and the outer exclusive charging plug 712 are used to charge the power card 100. The inner exclusive charging plug 709 and the outer exclusive charging plug 712 are part of an exclusive charging plug that connects to the exclusive charging jack 303. The exclusive charging plug is designed to be unique to the power base 500 and the power card 100. The power base 500 is designed to charge the power card 100 using the exclusive charging plug. The exclusive charging plug is a male connector that inserts into a female complementary exclusive charging jack 303 of the power card 100. The power base 500 is designed such that no charging system other than the power card 100 equipped with the complementary exclusive charging jack can be used. One purpose of the exclusive charging plug and the exclusive charging jack 303 is to prevent theft of the power base 500 and the power card 100. Another purpose of the exclusive charging plug and the exclusive charging jack 303 is to create an exclusive connection and/or link. With an exclusive connection and/or link, the power card can only be used with a compatible or complementary power base, and the power base can only be used with a compatible power card.

The inner exclusive charging plug 709 and the outer exclusive charging plug 712 provide contacts so that the power base 500 can electrically connect with the power card 100. The electrical connection to the power card 100 provides the necessary channel by which the power base 500 can charge the power card 100. The contacts of the inner exclusive charging plug 709 and the outer exclusive charging plug 712 can charge the power card 100 via capacitive or inductive coupling. The inner exclusive charging plug 709 and the outer exclusive charging plug 712 contact the electrical contacts of the female complementary exclusive charging contacts if the power base and power card are designed to the standards of the exclusive charging jack 303 of the power card 100 and exclusive charging plug of the power base 500. If the standard of the power card 100 or the power base 500 is different from the other, the charging contacts will not electrically and/or mechanically connect. As a result, the power card 100 will not be charged and/or recharged by the power base 500.

The inner exclusive charging plug 709 and the outer exclusive charging plug 712 connect to the inner exclusive charging contact 306 and the outer exclusive charging contact 309, respectively. When properly secured, there is an electrical connection between the plugs 709, 712 and the contacts 306, 309.

Marketing Display

Figure 8:
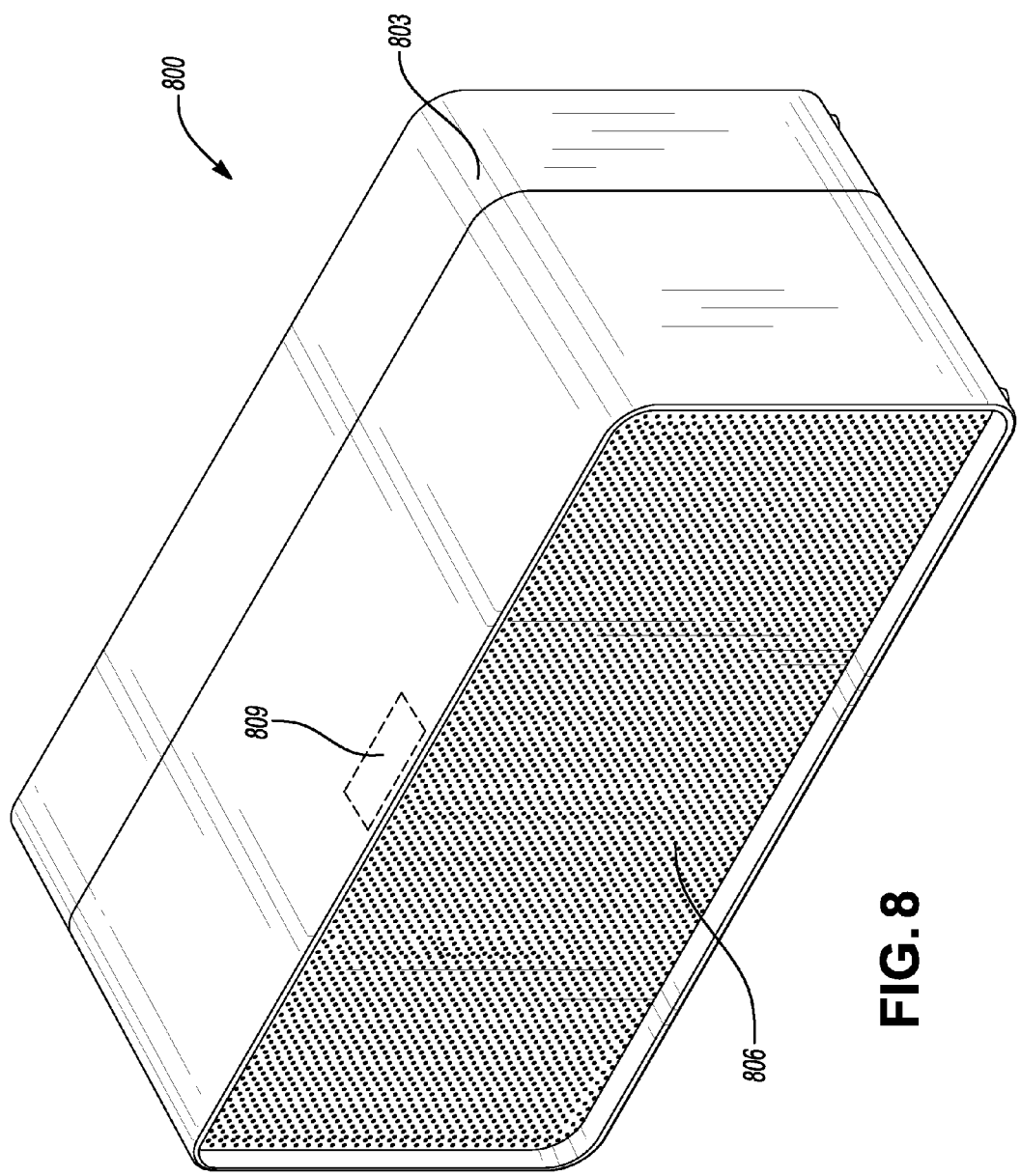
FIG. 8 illustrates a perspective view of a marketing display for a power base in accordance with an illustrative embodiment of the present invention.

FIG. 8 illustrates a perspective view of a marketing display 800 for a power base 500. The marketing display 800 includes a marketing display casing 803, front marketing display surface 806, and inscription location 809.

The marketing display casing 803 encloses at least one illumination source (not shown). Some examples of the at least one illumination source include an incandescent light source, a halogen light source, a compact fluorescent light source, and/or a light emitting diode (LED) light source. The sources can be light bulbs, for example. The marketing display casing 803 is configured to protect the at least one illumination source.

The front marketing display surface 806 encloses one side of the marketing display 800. The front marketing display surface 806 can include an indicator (not shown) that indicates when at least one power card 100 is available to be checked out by a user. The indicator can be a LED display, for example. In one embodiment, the front marketing display surface 806 includes an advertisement that is illuminated by the at least one illumination source within the marketing display casing 803. In another embodiment, the front marketing display surface 806 includes an advertisement that is not illuminated. In another embodiment, the front marketing display surface 806 includes an advertisement display that is illuminated and can change or rotate advertisements on the advertisement display. The advertisement display can be a LED display or an organic LED (OLED) display, for example. In another embodiment, the front marketing display surface 806 includes a video display. The video display can provide a continuous loop of video, images, and other content to be displayed. The video display can be controlled remotely via video feeds to the system, wireless connectivity, or other wireless systems.

The inscription location 809 is the location on the marketing display casing 803 where an inscription can be placed. In one example, the inscription can be the name of the company providing the power card 100 and/or the power base 500. In another example, the inscription can be an advertisement. The inscription location 809 can be of any size and at any location on the marketing display casing 803.

The marketing display 800 for the power base 500 can be used for various purposes. In one embodiment, the marketing display 800 can be configured to display a logo of an organization associated with the location of the marketing display 800. For example, a restaurant where the marketing display 800 is located can include its logo on the marketing display 800. In another embodiment, the marketing display 800 can be configured to display an advertisement of an organization not affiliated with an organization associated with the location of the marketing display 800. For example, an advertisement for an automobile dealer located near a restaurant where the marketing display 800 is located can include the automobile dealer's trademark and/or logo on the marketing display 800. In another embodiment, the marketing display 800 can be configured to display various marketing information and promotions.

Figure 9:
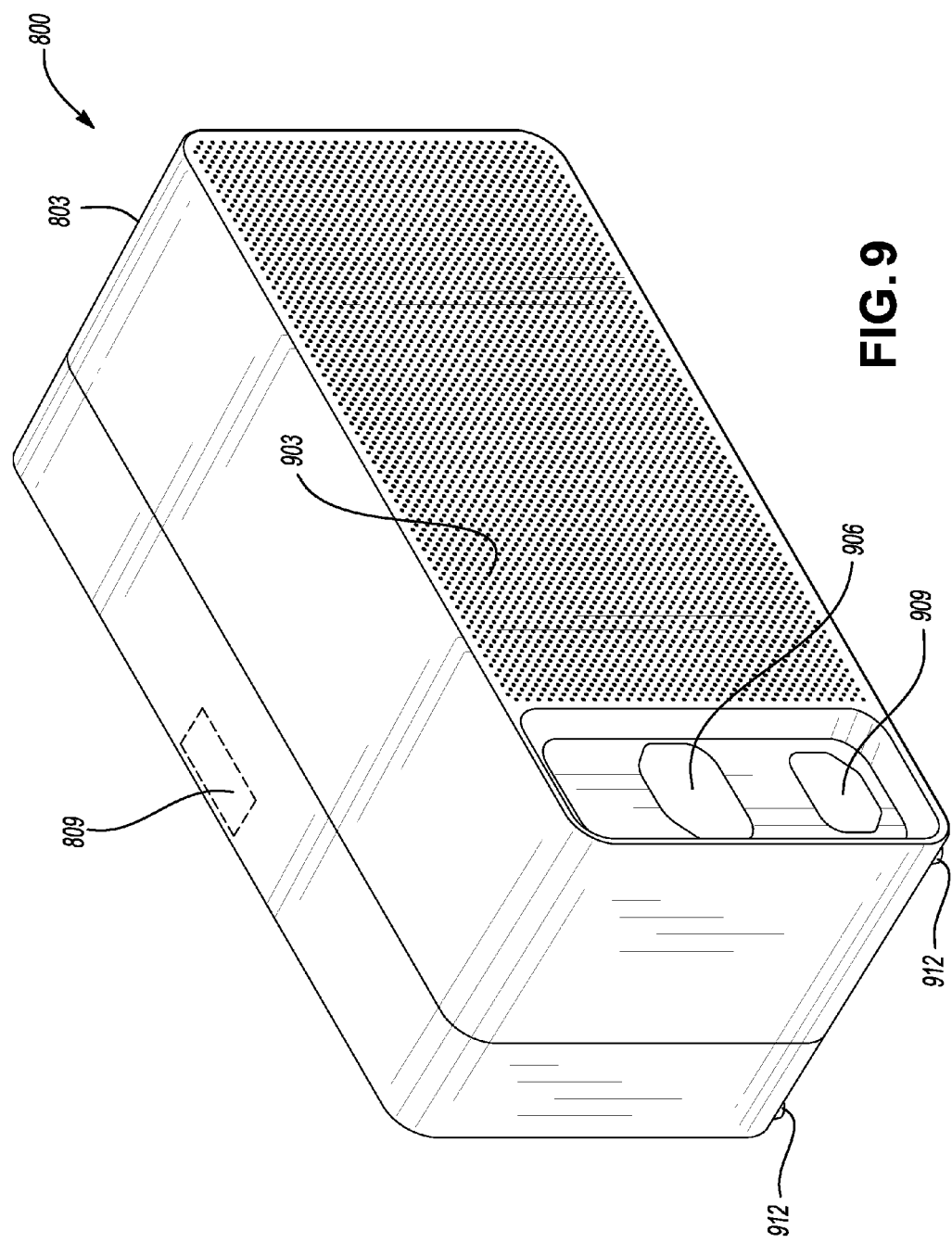
FIG. 9 illustrates a perspective view of a marketing display for a power base in accordance with an illustrative embodiment of the present invention.

FIG. 9 illustrates a perspective view of a marketing display 800 for a power base 500. The marketing display 800 includes a marketing display casing 803, inscription location 809, rear marketing display surface 903, upper power outlet cavity 906, lower power outlet cavity 909, and legs 912. In the illustrative embodiment, the marketing display 800 includes at least similar and/or identical features as those described herein.

The rear marketing display surface 903 encloses one side of the marketing display 800. In one embodiment, the rear marketing display surface 903 includes an advertisement that is illuminated by the at least one illumination source within the marketing display casing 803.

The upper power outlet cavity 906 and the lower power outlet cavity 909 provide cavities for power outlet connections to be disposed. For example, a power outlet connection device (not shown) can be inserted into the cavities. The power outlet connection device can be electrically connected to the internal components of the marketing display 800 to provide an electrical connection to the illumination source enclosed within the marketing display casing 803. The power outlet connection device can be electrically connected to a standard alternating current outlet. The power outlet connection device can also include an alternating current to direct current converter. The power outlet connection device can be electrically connected to a power base 500 and/or an additional marketing display 800.

The marketing display 800 includes at least one leg 912. In FIG. 9, the marketing display 800 includes four legs 912 (2 shown, 2 not shown). Although illustrated as having four legs 912, the marketing display 800 can include any combination of legs 912 and/or include no legs. The marketing display 800 is stackable. The legs 912, located on the bottom portion of the marketing display 800, can rest on the top of another marketing display 800 and/or a power base 500. For example, the marketing display 800 can be stacked on additional marketing displays 800 and/or power bases 500 such that the number of advertisement locations on marketing displays 800 can be increased. For each marketing display 800, the number of advertising locations is multiplied by the number of stacked marketing displays 800. Any number of marketing displays 800 can be stacked.

Power Card, Power Base, and Marketing Display

Figure 10:
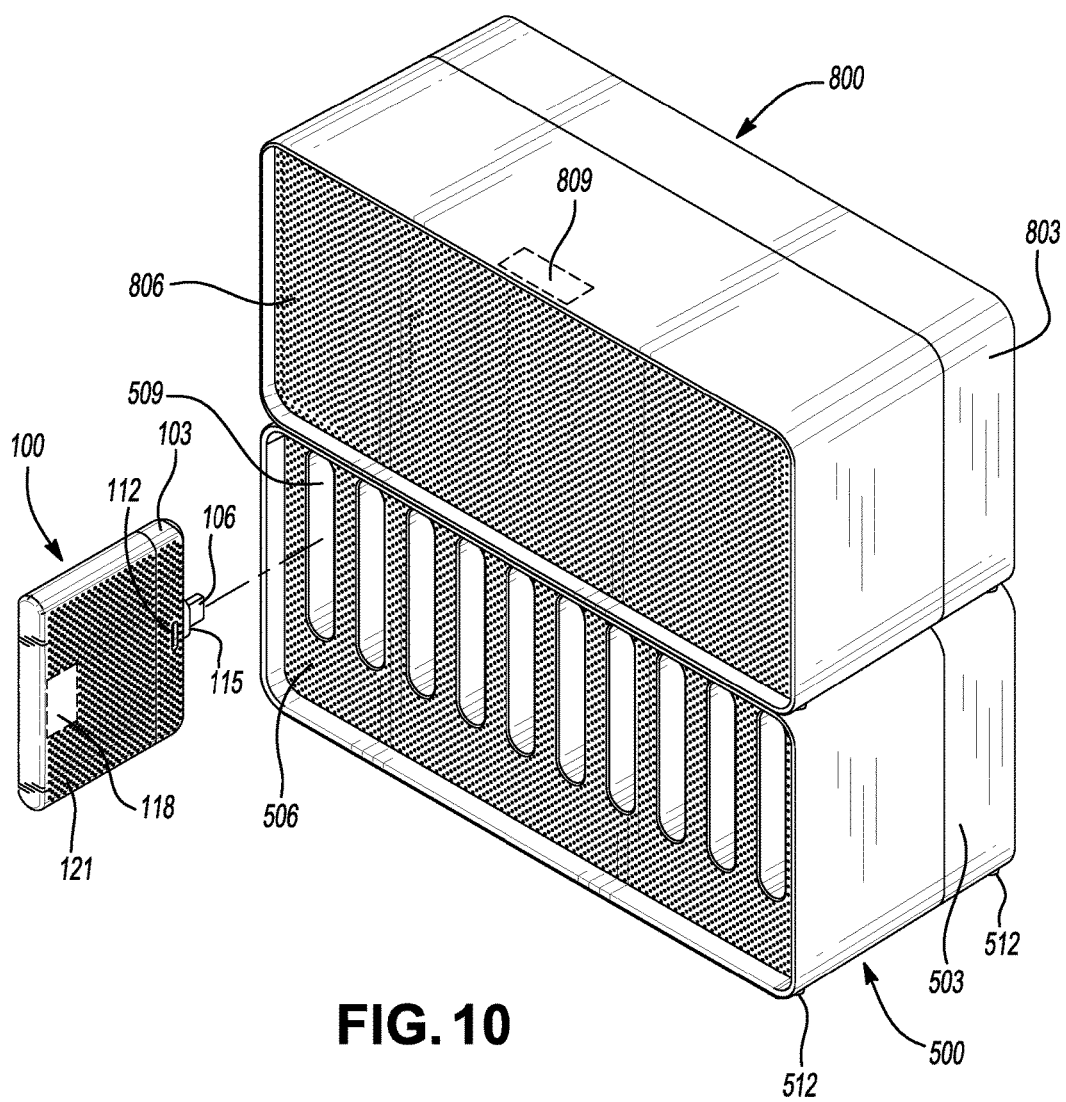
FIG. 10 illustrates a perspective view of a power card, a power base, and a marketing display in accordance with an illustrative embodiment of the present invention.

FIG. 10 illustrates a perspective view of a power card 100, a power base 500, and a marketing display 800. The power card 100 includes a casing 103, connector 106, latch cavity 112, separator 115, inscription location 118, and non-slip surface 121. The power base 500 includes a casing 503, front power base surface 506, power card cavity 509, legs 512, and inscription location 515. The marketing display 800 includes a marketing display casing 803, front marketing display surface 806, and inscription location 809. In the illustrative embodiment, the power card 100, power base 500, and marketing display 800 include at least similar and/or identical features as those described herein.

Authentication

Figure 11:
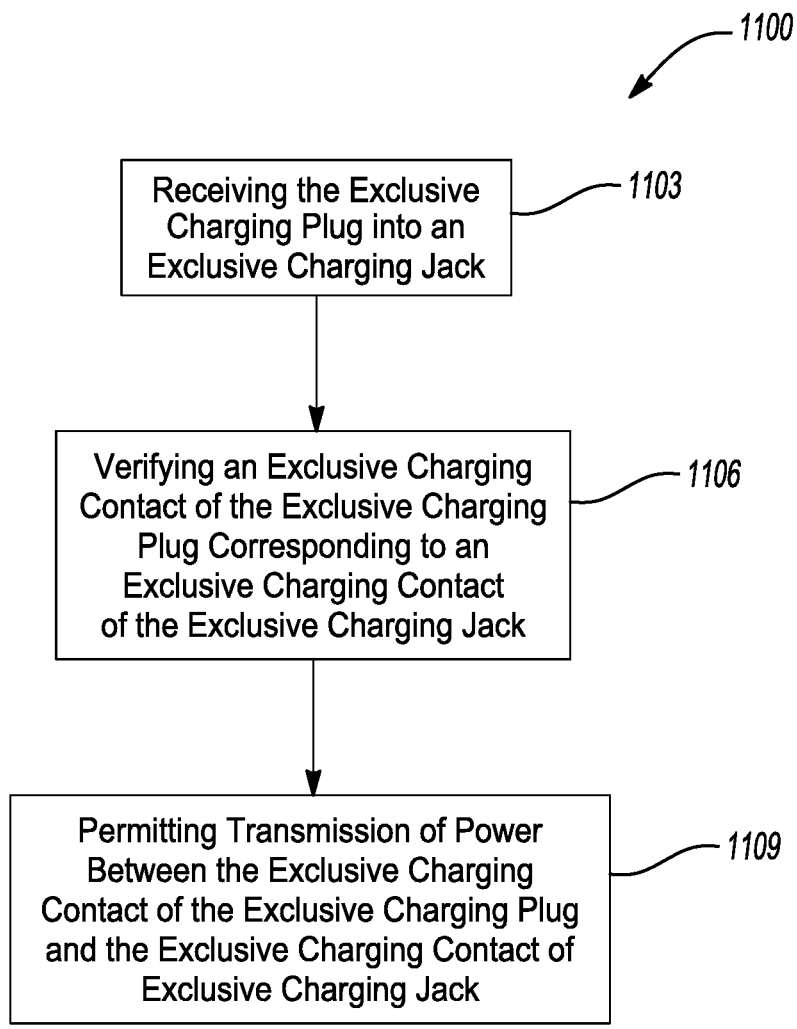
FIG. 11 illustrates a block diagram of a method of authenticating an exclusive charging plug in accordance with an illustrative embodiment of the present invention.

FIG. 11 illustrates a block diagram of a method 1100 of authenticating an exclusive charging plug. The method 1100 includes receiving the exclusive charging plug into an exclusive charging jack at 1103. In one embodiment, receiving the exclusive charging plug into the exclusive charging jack includes creating a secure connection between the exclusive charging plug and the exclusive charging jack. The secure connection can include establishing an electrical connection between the exclusive charging plug and the exclusive charging jack. The electrical connection can include at least one anode connection and at least one cathode connection. In another embodiment, the exclusive charging plug and the exclusive charging jack each include two exclusive charging contacts. In another embodiment, the exclusive charging contacts are configured to make an electrical connection when the contacts touch.

The method 1100 includes verifying an exclusive charging contact of the exclusive charging plug corresponding to an exclusive charging contact of the exclusive charging jack at 1106. In one embodiment, verifying an exclusive charging contact of the exclusive charging plug corresponding to an exclusive charging contact of the exclusive charging jack includes determining a secure connection between an exclusive charging contact of the exclusive charging plug with a corresponding exclusive charging contact of the exclusive charging jack. In another embodiment, verifying an exclusive charging contact of the exclusive charging plug corresponding to an exclusive charging contact of the exclusive charging jack includes determining whether the electrical connection satisfies at least one power threshold. In another embodiment, the method 1100 includes determining whether the exclusive charging contact of the exclusive charging jack is capable of receiving the power available from the exclusive charging contact of the exclusive charging plug.

The method 1100 includes permitting transmission of power between the exclusive charging contact of the exclusive charging plug and the exclusive charging contact of the exclusive charging jack at 1109. In one embodiment, permitting transmission of power between the exclusive charging contact of the exclusive charging plug and the exclusive charging contact of the exclusive charging jack includes transmitting power via the electrical connection. The power being transmitted can cease when the at least one battery of the power card is fully charged.

In one embodiment, the method 1100 includes illuminating at least one light-emitting diode (LED) on a power card. The at least one LED is configured to illuminate when it receives power. In another embodiment, the at least one LED can emit a sequence of light pulses to indicate verification of charging or that the charging contacts are capable of transmitting power.

Implementations disclosed herein provide systems, methods, and apparatus for a power card and base. Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

It should be noted that the terms "couple," "coupling," "coupled," or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details.

Headings are included herein for reference and to aid in locating various sections. These headings are not intended to limit the scope of the concepts described with respect thereto. Such concepts may have applicability throughout the entire specification.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A power card configured to be charged by a power base and configured to charge an electronic device, including:
   a case configured to enclose at least one rechargeable battery and a circuit board,
   wherein the at least one rechargeable battery and the circuit board are electrically connected;
   a connector electrically connected to the circuit board;
   each of at least two charging jacks include at least two charging contacts;
   at least one charging contact of the at least two charging contacts is electrically connected to the circuit board;
   the at least two charging jacks are configured to receive power and charge the at least one rechargeable battery, wherein first and second charging jacks of the at least two charging jacks are disposed near the connector and located on the same side of the power card as the connector; and
   the first charging jack is symmetrical to the second charging jack about an axis of the connector such that the power card can be inserted into a charging position of the power base in at least two configurations, wherein the power base charges the power card in each configuration of the at least two configurations.

2. The power card of claim 1, wherein the circuit board regulates power to and from the at least one rechargeable battery and a plurality of light-emitting diodes disposed on or within the case indicate the power level of the at least one rechargeable battery.

3. The power card of claim 1, wherein the connector is a USB Type-C connector, micro-USB connector, USB Micro-B connector, mini-USB, Lightning connector, or 30-pin dock connector.

4. The power card of claim 1, wherein the at least one exclusive charging contact is configured to receive at least one charging contact of a charging device.

5. The power card of claim 1, wherein the connector is configured to connect directly to an electronic device.

6. The power card of claim 1, wherein the case includes a separator, the separator at least partially surrounds the connector and is configured to support the connector.

7. The power card of claim 1, wherein the case includes a latch cavity, the latch cavity being configured to receive at least one latch.

8. The power card of claim 1, wherein the connector is flexible or moveable within the case and within a separator disposed between the case and the connector.

9. A power base for charging at least one power card including:
   a case configured to enclose at least one power converter;
   at least one power card cavity configured to receive the at least one power card;
   at least one connector port disposed within the at least one power card cavity, the at least one connector port is recessed relative to the at least one power card cavity and configured to receive at least one connector of the at least one power card;
   at least one latch configured to connect with at least one latch cavity of the at least one power card;
   at least two charging plus's, wherein at least one of the at least two charging plugs is electrically connected to the at least one power converter
   and at least one of the at least two charging plugs is configured to transmit power to and charge at least one rechargeable battery of the at least one power card; and
   the power base is configured such that the at least one power card can be inserted into a charging position of the power base in at least two configurations, wherein the power base charges the at least one power card in each configuration of the at least two configurations.

10. The power base of claim 9, wherein the connector port is configured to receive a USB Type-C connector, micro-USB connector, USB Micro-B connector, mini-USB, Lightning connector, or 30-pin dock connector.

11. The power base of claim 9, wherein at least one of the at least two charging plugs is configured to transmit power to at least one charging jack of the at least one power card.

12. The power base of claim 9, wherein the at least one connector port receives at least a portion of a separator of the at least one power card.

13. The power base of claim 9, wherein the case includes at least one indicator configured to indicate when the at least one power card is fully charged, partially charged, or not charged.

14. The power base of claim 9, wherein the case includes at least one indicator configured to indicate when the at least one power card is secured by the at least one latch and the at least one latch cavity.

15. The power base of claim 9, wherein at least one of the at least two charging plugs is magnetically coupled to at least one charging jack of the at least one power card.

16. The power base of claim 9, wherein at least one of the at least two charging plugs and at least one charging jack of the at least one power card transmit power via capacitive or inductive coupling.

* * * * *